April 14, 1959  M. O. HOLTAN  2,881,639
POWER TRANSMISSION GEARING
Filed Jan. 27, 1955  2 Sheets-Sheet 1

INVENTOR.
M. O. HOLTAN
BY
*Miles Kenninger*
ATTORNEY

April 14, 1959  M. O. HOLTAN  2,881,639
POWER TRANSMISSION GEARING
Filed Jan. 27, 1955  2 Sheets-Sheet 2

INVENTOR.
M. O. HOLTAN
BY
Miles Kenninger

United States Patent Office 2,881,639
Patented Apr. 14, 1959

2,881,639

POWER TRANSMISSION GEARING

Maurice O. Holtan, Wauwatosa, Wis.

Application January 27, 1955, Serial No. 484,387

11 Claims. (Cl. 74—681)

This invention relates to improvements in speed changing gearing, reversible, speed changing power transmissions and the like and especially to transmissions in which a wide range of "forward" and "reverse" output speeds are required, with at least one speed especially adapted for work requiring slow motion.

For example, in tractors of various kinds, at least one speed is desired permitting such operations as planting or transplanting by a person seated on the tractor or on a trailer. Heretofore it was possible to obtain the desired low tractor speeds only by friction or hydraulic drives, by way of sprocket chains and wheels or by long gear trains added to the speed changing transmission or by use of several sources of power. However, friction or hydraulic drives are not positive while sprocket wheel drives or gear trains are positive but bulky and difficult to lubricate adequately.

Two-wheeled skids, dump carts, wheelbarrows and the like are usually as heavily loaded as possible for handling by a person on foot. In some cases at least, the person must balance a part of the load as well as steer the vehicle. Power has heretofore been used for the movement of skids and the like, only by way of industrial lift trucks and it has been heretofore considered impractical to apply a small power unit to carts, wheelbarrows and the like because of the low speeds and the wide range of speeds desired.

It is therefore one object of the present invention to provide a power transmission which provides a positive drive and in which a wide range of speeds and especially low speeds in either or both directions, are obtained from a relatively high speed source of power.

Another object of the invention is to provide a speed changing transmission utilizing only gearing, in which the number of speeds obtainable is limited only by the number of counter-shafts or their equivalent and the gearing mounted thereon which may be placed in a given size housing.

Another object of the invention is to provide a multi-speed power transmission in which one shaft either directly or indirectly drives one portion of a differential gearing while one of the other portions of the differential drives another shaft.

Another object of the invention is to provide a multiple speed, speed-changing power transmission in which one shaft is selectively geared to and drives the side gears of a differential, of which the differential pinions are connected to and drive another shaft.

Another object of the invention is to provide a multi-speed reversible power transmission in which the side gears of a differential are driven in opposite directions by one shaft and the differential pinions transmit one-half of the net difference in speed between the side gears, to another shaft.

Another object of the invention is to provide a multi-speed power transmission in which the input and output shafts may be either co-axial, parallel, with the shaft axes at right angles or with single or double-ended output shafts.

Other advantages and objects than those above set forth will be apparent from the following description when read in connection with the accompanying drawings in which.

Generally, the present invention involves a housing which may be substantially rectangular or semi-cylindrical or may vary in shape from triangular to a polygon approaching a circle, dependent on the space available in the vehicle to which the transmission is applied. The input shaft drives the side gears of differential gearing, either as directly as possible or through a number of gear trains, by which the side gears are rotated in opposite directions and at speeds which will give a desired speed difference between the side gears. However, the present invention is not limited to driving of the differential side gears by the input shaft as driving of the differential pinions by the input shaft is equally feasible but not as convenient as such driving of the side gears.

The number of gears or gear-trains interposed between the input shaft and the differential side gears is limited only by the permissible transmission overall dimensions, the weight and the cost of the transmission. The present invention employs a number of counter-shafts and clutches whereby a large number of different power flow paths are obtained which produces an equally large number of speeds within a wide range.

Figures 1, 3:
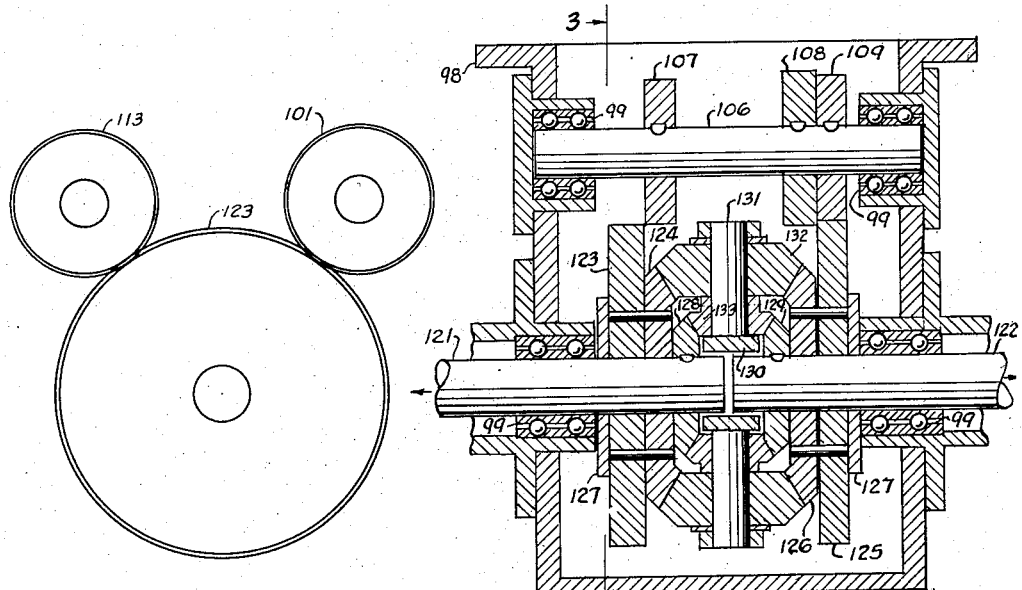
Fig. 1 is a sectional view on substantially a central plane of one embodiment of the invention.
Fig. 3 is a diagram of the relationship of gears along the plane 3—3 of Fig. 1.
Figure 2:
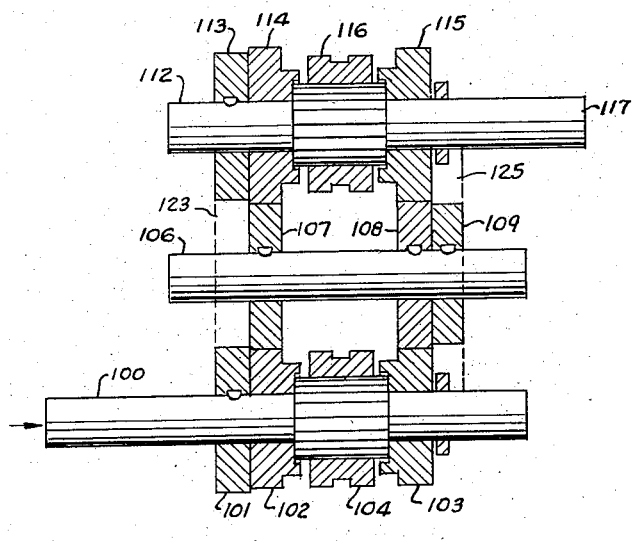
Fig. 2 is a partial top plan view of the structure shown in Fig. 1 to illustrate the relationships of some shafts and gears.

When the present transmission is to be used for driving the two wheels of a tractor or the like by way of the usual axle-transmission drive unit and which requires provision of means permitting different speeds of the driven wheels as when turning a corner, a differential is provided which has no other function than permitting the wheels to turn the corner when full power is applied. Figs. 1, 2 and 3 show a construction in which one differential gearing is part of the speed changing transmission and another differential gearing determines "cornering" of the wheels. Housing 98 again rotatably supports a number of shafts in suitable bearings, one of the shafts being divided into two portions and with each portion supported in double bearings 99. An input shaft 100 has fixed thereto a gear 101 and has rotatably mounted thereon gears 102 and 103. The input shaft also has a splined portion on which a jaw clutch part 104 is slidable into and out of engagement with jaws on adjacent surfaces of the gears 102 and 103.

A counter-shaft 106 is parallel to the input shaft and has gears 107, 108 and 109 fixed thereon, gears 107 and 108 meshing, respectively, with gears 102 and 103 on the input shaft. Another counter-shaft 112 is mounted parallel to the input shaft and has gear 113 fixed thereto and gears 114 and 115 rotatable thereon and is provided with a splined portion for sliding of a jaw clutch portion 116 to engage and disengage the corresponding jaws on gears 114 and 115. Counter-shaft 112 also has a portion 117 extending beyond the housing and serving as a power take-off for various purposes as is well known. Gears 114 and 115, respectively, mesh with gears 107 and 108 on the counter-shaft.

A power output shaft is divided into two portions 121 and 122 which are severally supported in bearings 99 and are spaced at their adjacent ends. Output shaft portion 121 supports a gear 123 which is pinned or otherwise secured to a bevel gear 124, both gears being rotatable on the shaft 121. Output shaft portion 122 likewise rotatably supports gears 125 and 126 which are joined, and thrust bearings 127 are interposed between the pairs of gears and the housing. The gears 124 and 126 are side gears of a differential gearing taking part in the speed changing action. Bevel gears 128 and 129 are fixed, respectively, on the output shaft portions 121 and 122 and form parts of a differential allowing the driven wheels to turn corners.

A ring 130 with arms 131 forms a spider on which are rotatably mounted sets of pinion gears 132 and 133 for engaging respectively, with the side gears 124, 126 of the speed changing differential and side gears 128, 129 of the "cornering" differential. By reference to Figs. 2 and 3, it will be seen that gears 123 and 125 mesh, respectively, with gears 101 and 113 and gear 109, the gears 123 and 125 being indicated in dotted line in Fig. 2 to facilitate tracing the power flow paths at different speeds. Gear 101 has 36 teeth, gear 123 has 80 teeth and gear 125 has 81 teeth, and each of such gears enters into each power flow path.

Assuming that clutches 104 and 116 are shifted to engage gears 102 or 103 and 114 or 115, respectively, when such gears enter into a power flow path, the following table shows the gears utilized in each of three forward speeds and in one reverse speed, again assuming an input speed of 2500 r.p.m., the numbers of the teeth of the several gears being shown below the reference numeral designating the gear.

|  | Gear Train | Ratio | Output, r.p.m. |
|---|---|---|---|
| Teeth | 101, 123, 113, 115, 108, 109, 125<br>36, 80, 36, 38, 37, 35, 81 | 311–1 | (forward)<br>7¾ |
| Do | 101, 123, 102, 107, 109, 125<br>36, 80, 35, 36, 35, 81 | 67–1 | 37 |
| Do | 101, 123, 103, 108, 109, 125<br>36, 80, 34, 37, 35, 81 | 38–1 | 66 |
| Do | 101, 123, 113, 114, 107, 109, 125<br>36, 80, 36, 39, 36, 35, 81 | 110–1 | (reverse)<br>22 |

Figure 4:
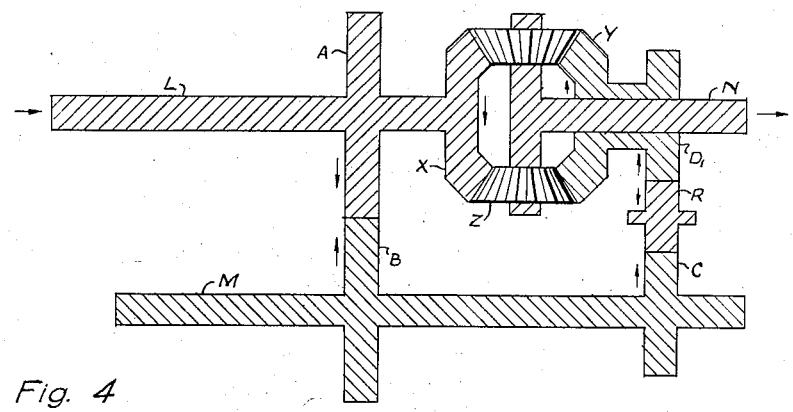
Figs. 4, 5 and 6 are mechanical diagrams showing the different results due to different ways of connecting the input and output shafts to the differential.
Figure 5:
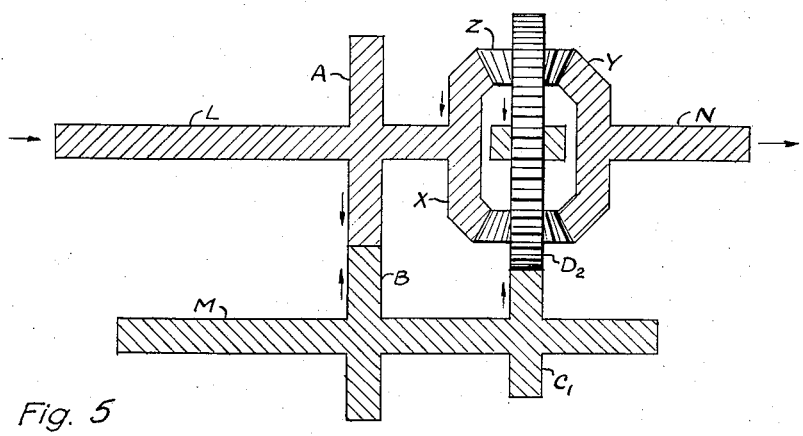
Figure 6:
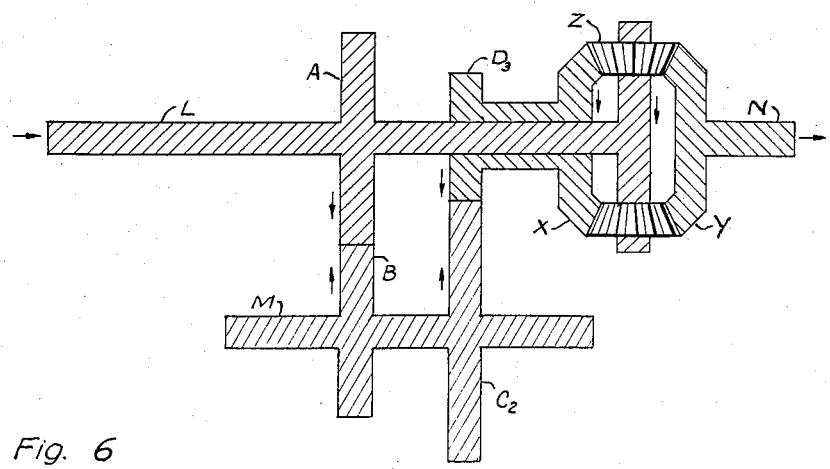

Figs. 4, 5 and 6 are mechanical diagrams of the way in which the present invention may be applied, and with parts designated by letters some of which are employed in the formulae severally applicable to the different diagrams. Fig. 4 is the general condition applicable to the various modifications previously described where L designates the input shaft driving gear A and the differential side gear X. Gear A meshes with gear B on the countershaft M which also carries gear C. Gear C meshes with gear R which meshes with gear $D_1$ to which the differential side gear Y is connected. Idler gear R (with 28 teeth) merely reverses the direction of rotation of the side gear Y as compared to the direction of rotation of the side gear X. The output shaft N is formed with spider arms on which the differential pinions Z rotate with and relative to the spider arms.

In Fig. 4, the input shaft is connected with one side gear of the differential and also drives and regulates the speed ratio of the other side gear, the two side gears rotating in opposite directions. The output speed "$O_s$" (either forward or reverse), is one-half of the speed difference between the two side gears, the formula being $$I_s - \left(I_s \times \frac{A}{B} \times \frac{C}{D_1}\right) \times \frac{1}{2} = O_s$$

in which $I_s$ is the input shaft speed and $O_s$ is the output shaft speed. Assuming that the input shaft speed ($I_s$) is 2500 r.p.m. and that the gears have the following number of teeth

| A | B | C | $D_1$ |
|---|---|---|---|
| 45 | 44 | 30 | 31 | the equation is $$2500 - \left(2500 \times \frac{45}{44} \times \frac{30}{31}\right) \times \frac{1}{2} = 12.830 \text{ r.p.m.}$$

Output speed forward, ratio 195 to 1

In Fig. 5, the input shaft L again drives gear A and differential side gear X while the gear A meshes with gear B on counter-shaft M. But the gear $C_1$ now meshes with ring gear $D_2$ by which the spider, and differential pinions Z, are rotated in the same direction as the input shaft, the pinions spinning on their several arms as is usual. The output shaft N is now driven by the differential side gear Y, either forward or reverse.

Where the input shaft is connected with one side gear of the differential and also drives and regulates the speed ratio of the spider, both rotating in the same direction, the output speed is the difference between twice the speed of the spider and pinion gears and the speed of the input shaft driven side gear. The formula for this arrangement is $$2\left(I_s \times \frac{A}{B} \times \frac{C_1}{D_2}\right) - I_s = O_s$$

Again assuming that the input shaft speed ($I_s$) is 2500 r.p.m. and that the gears have the following number of teeth

| A | B | $C_1$ | $D_2$ |
|---|---|---|---|
| 45 | 44 | 30 | 59 | the equation is $$2\left(2500 \times \frac{45}{44} \times \frac{30}{59}\right) - 2500 = 100.154 \text{ r.p.m.}$$

Output speed forward, ratio 25 to 1

In Fig. 6, the input shaft L drives the gear A and the spider and pinions Z and the gear A meshes with the gear B on counter-shaft M. Gear $C_2$ now meshes with gear $D_3$ which drives the differential side gear X in the same direction as the spider and pinions Z. The differential side gear Y drives the output shaft N (either forward or reverse).

Where the input shaft is connected with the spider and pinions and also drives one of the side gears in the same direction, the output speed (either forward or reverse), is the difference between two times the spider speed and the speed of the input shaft driven side gear. The formula for this arrangement is $$2I_s - \left(I_s \times \frac{A}{B} \times \frac{C_2}{D_3}\right) = O_s$$

Again assuming the input speed as 2500 r.p.m. and that the gears have the following number of teeth

| A | B | $C_2$ | $D_3$ |
|---|---|---|---|
| 45 | 44 | 59 | 30 | the equation is $$2 \times 2500 - \left(2500 \times \frac{45}{44} \times \frac{59}{30}\right) = 28.409 \text{ r.p.m.}$$

Output speed reverse, ratio 88 to 1

It will be seen that the present invention uses the principal functions of a differential together with gearing to obtain a wide range of speed ratios and is different in operation and in results from the common and accepted uses of differential gearing. A differential has three component parts, two side gears and a spider with pinions, which usually operate in the following manner:

(1) With power moving the differential spider pinions and the two side gears rotating in the same direction as the spider, the total speed of the two side gears equals twice the speed of the spider.

(2) With power applied to the spider and with one side gear held stationary, the other side gear rotates in the same direction and at twice the speed of the spider.

(3) With power applied to one side gear and with the spider held in a fixed position, the other side gear rotates in the opposite direction and at the same speed as the input power side gear.

(4) With power applied to one side gear and with the other side gear held stationary, the spider rotates in the same direction and at one-half the speed of the input power side gear.

The above actions are the simple functions of the three component parts of a differential and are used today in the rear axles of automobiles, in machine tools and many other applications where power can be applied to one of the three component differential parts and one of the other component parts can be braked or locked to obtain one of or a combination of mechanical actions described above. The present invention however differs from the above simple functions of the three component parts of a differential, and includes a chain of gears between two of the component parts to give a high ratio of speed on the third part, and, if desired, a large number of speeds, either forward or reverse.

To obtain ratios of speed change in a conventional transmission such as are given by the present constructions, would require a long train of selectable gearing with many small pinions and many large gears because the speed change ratio would be only that obtained from the selectable gearing. The major difference between the known types of geared transmissions yielding only a low ratio speed change and the present large ratio speed change transmission is in the present use of a differential with the selective gearing itself on a low ratio of as near to one to one as will produce the high ratio speeds desired and to increase the selective gearing ratio to produce the lower ratio speeds desired as can be seen from the following table from which the example in the description of Fig. 4 is taken. The input speed is 2500 r.p.m.

|       | Gears |    |    |    | Ratio    | Output, r.p.m. |
|-------|-------|----|----|----|----------|----------------|
|       | A     | B  | C  | D  |          |                |
|       |       |    |    |    |          | (forward)      |
| Teeth | 41    | 48 | 30 | 31 | 11 to 1  | 216.7          |
| Do    | 42    | 47 | 30 | 31 | 15 to 1  | 169.0          |
| Do    | 43    | 46 | 30 | 31 | 21 to 1  | 119.2          |
| Do    | 44    | 45 | 30 | 31 | 37 to 1  | 67.2           |
| Do    | 45    | 44 | 30 | 31 | 195 to 1 | 12.8           |
|       |       |    |    |    |          | (reverse)      |
| Do    | 46    | 43 | 30 | 31 | 57 to 1  | 44.0           |
| Do    | 47    | 42 | 30 | 31 | 25 to 1  | 103.6          |

Herein the phrase "speed of the pinion or pinions" and the like refers to the speed of rotation of the spider and pinions about the axis of the side gears and the spider.

It will be apparent to those skilled in the art that various changes and modifications may be made in the constructions illustrated and described without departing from the spirit of the invention or from the scope of the appended claims.

I claim:

1. In a reversible change-speed power transmission and differential unit, an input shaft, an output shaft having two separate portions, a first differential having side gears severally rotatable on the output shaft portions, first gearing selectively connectible with the input shaft for rotating the side gears of the first differential at different speeds, a second differential comprising side gears severally fixed on the output shaft portions, sets of differential pinions, the sets of pinions severally meshing with the side gears of one differential, and gearing selectively connectible with the first differential side gears for rotating the side gears at different speeds, selective engagement of the first said gearing determining a plurality of ratios of speed transmission in one direction and selective engagement of the second said gearing determining another ratio of speed transmission in the said one direction and reversal of rotation of the output shaft relative to the input shaft, the second differential compensating for differences in speed imposed on the separate output shaft portions by the members driven thereby.

2. In a reversible change-speed power transmission and differential unit, an input shaft, an output shaft having two separate portions, a first differential having side gears severally rotatable on the output shaft portions, gears rotatable on the input shaft, a clutch secured to the input shaft for selective connection of the gears therewith of the gear rotatable thereon, a second differential comprising side gears severally fixed on the output shaft portions, sets of differential pinions, the sets of pinions severally meshing with the side gears of one differential, and gearing selectively connectible with one of the first differential side gears for rotating the side gears at different speeds, selective engagement of the gears determining a plurality of ratios of speed transmission in one direction and selective engagement of the gearing determining another ratio of speed transmission in the said one direction and reversal of rotation of the output shaft relative to the input shaft, the second differential compensating for differences in speed imposed on the separate output shaft portions by the members driven thereby.

3. In a reversible change-speed power transmission and differential unit, an input shaft, an output shaft having two separate portions, a first differential having side gears severally rotatable on the output shaft portions, first gearing selectively connectible with the input shaft for rotating the side gears of the first differential at different speeds, a second differential comprising side gears severally fixed on the output shaft portions, sets of differential pinions, the sets of pinions severally meshing with the side gears of one differential, a first counter-shaft, a second counter-shaft, gears severally mounted on the counter-shafts, a clutch secured on the second counter-shaft for selective engagement with the gears thereon, selective engagement of the input shaft gearing determining a plurality of ratios of speed transmission in one direction and selective engagement of the gears on the second counter-shaft determining another ratio of speed transmission in the said one direction and reversal of rotation of the output shaft relative to the input shaft, the second differential compensating for differences in speed imposed on the separate output shaft portions by the members driven thereby.

4. In a reversible change-speed power transmission and differential unit, an input shaft, an output shaft having two separate portions, a first differential having side gears severally rotatable on the output shaft portions, a gear fixed on the input shaft and constantly in mesh with a side gear of the first differential, gears rotatable on the input shaft, a clutch secured to the input shaft for selective connection of the rotatable gears therewith, a second differential comprising side gears severally fixed on the output shaft portions, sets of differential pinions, the sets of pinions severally meshing with the side gears of one differential, a first counter-shaft, a second counter-shaft, a gear fixed on the second counter-shaft and constantly in mesh with one side gear of the first differential, gears rotatable on the second counter-shaft, and a clutch for selective connection of the rotatable second counter-shaft gears therewith, selective engagement of the rotatable gears on the input shaft determining a plurality of ratios of speed transmission in one direction and selective engagement of the rotatable gears on the second counter-shaft determining another ratio of speed transmission in the said one direction and reversal of rotation of the output shaft relative to the input shaft, the second differential compensating for differences in speed imposed on the separate output shaft portions by the members driven thereby.

5. In a reversible change-speed power transmission and differential unit, an input shaft, an output shaft having two separate portions, a first differential having side gears severally rotatable on the output shaft portions, a gear fixed on the input shaft and constantly in mesh with one side gear of the first differential, gears rotatable on the input shaft, a clutch secured to the input shaft for selective connection of the rotatable gears therewith, a second differential comprising side gears severally fixed on the output shaft portions, sets of differential pinions, the sets of pinions severally meshing with the side gears of one differential, a first counter-shaft, a second counter-shaft, a gear fixed on the second counter-shaft and constantly in mesh with the other side gear of the first differential, gears rotatable on the second counter-shaft, and a clutch secured on the second counter-shaft for selective engagement with the rotatable gears thereon, selective engagement of the input shaft gears determining a plurality of ratios of speed transmission in one direction and selective engagement of the second counter-shaft gears determining another ratio speed of transmission in the said one direction and reversal of rotation of the output shaft relative to the input shaft, the second differential compensating for differences in speed imposed on the separate output shaft portions by the members driven thereby.

6. In a combined speed change gearing and differential gearing unit for driving a pair of vehicle wheels, an input shaft, a gear fixed on the input shaft, a counter-shaft, a gear fixed on the counter-shaft, first pairs of meshing speed change gears for interconnecting the input shaft and the counter-shaft, one of each of the pairs of gears being rotatable and the other being fixed on its shaft, the number of first pairs of gears being equal in number to a predetermined number of speed changes, clutches for severally engaging the rotatable speed change gears with a shaft, a pair of coaxial output shafts, second pairs of gears rotatably and severally mounted on the output shafts, one gear of each second pair of gears being a bevel gear, the other gears of the second pairs of gears severally meshing with the gear fixed on the input shaft and the gear fixed on the counter-shaft, a third pair of gears severally fixed on the output shafts, the third pair of gears both being bevel gears, a spider rotatable adjacent the bevel gears, and sets of pinions rotatable on the spider for severally meshing with the bevel gears of the second pairs of gears and with the third pair of bevel gears for forming separate differentials, one differential coacting with the speed change gears as a speed change power transmission and the other differential providing varying speeds of the wheels in turning a corner.

7. In a combined speed change gearing and differential gearing unit for driving a pair of vehicle wheels, an input shaft, a gear fixed on the input shaft, a counter-shaft, a gear fixed on the counter-shaft, first pairs of meshing speed change gears for interconnecting the input shaft and the counter-shaft, one of each of the pairs of speed change gears being rotatable and the other being fixed on its shaft, the number of pairs of speed change gears being equal in number to a predetermined number of speed changes, clutches for severally engaging the rotatable speed change gears with a shaft, a pair of coaxial output shafts, second pairs of gears rotatably and severally mounted on the output shaft, one gear of each second pair of gears being a bevel gear, the other gears of the second pairs of gears severally meshing with the gear fixed on the input shaft and the gear fixed on the counter-shaft, a third pair of gears severally fixed on the output shafts, the third pair of gears being bevel gears, a single spider rotatable between the bevel gears of the second pairs of gears and the third pair of gears, and two sets of pinions rotatable on the spider for severally meshing with the bevel gears of the second pairs of gears and with the third pair of gears to coact therewith in forming two differentials, the one differential being within the other, the one differential coacting with the speed change gears as a speed change power transmission and the other differential providing various speeds of the wheels in turning a corner.

8. In a combined speed change gearing and differential gearing unit for driving a pair of vehicle wheels, an input shaft, a gear fixed on the input shaft, a counter-shaft, a gear fixed on the counter-shaft, first pairs of meshing speed change gears for interconnecting the input shaft and the counter-shaft, one of each of the pairs of gears being rotatable and the other being fixed on its shaft, the pairs of speed change gears having the same total number of teeth whereby such pairs of gears are self-synchronizing, the number of first pairs of gears being equal in number to a predetermined number of speed changes, mechanical clutches for severally engaging the rotatable speed change gears with a shaft, a pair of coaxial output shafts, second pairs of gears rotatably and severally mounted on the output shaft, one gear of each second pair of gears being a bevel gear, the other gears of the second pairs of gears severally meshing with the gear fixed on the input shaft and the gear fixed on the counter-shaft, a third pair of gears severally fixed on the output shafts, the third pair of gears being bevel gears, a spider rotatable adjacent the bevel gears, and sets of pinions rotatable on the spider for severally meshing with the bevel gears of the second pairs and with the third pair of gears for forming separate differentials, one differential coacting with the speed change gears as a speed change power transmission shiftable under load and the other differential providing varying speeds of the wheels in turning a corner.

9. In a combined speed change gearing and differential gearing unit for driving a pair of vehicle wheels, an input shaft, a gear fixed on the input shaft, a counter-shaft, a gear fixed on the counter-shaft, first pairs of meshing speed change gears for interconnecting the input shaft and the counter-shaft, one of each of the pairs of gears being rotatable and the other being fixed on its shaft, jaw clutches for severally engaging the rotatable speed change gears with a shaft, engagement of the several rotatable speed change gears by the clutches changing the counter-shaft speed by no more than 20% between speed change steps, a pair of coaxial output shafts, second pairs of gears rotatably and severally mounted on the output shaft, one gear of each second pair of gears being a bevel gear, the other gears of the second pairs of gears severally meshing with the gear fixed on the input shaft and the gear fixed on the counter-shaft, a third pair of gears severally fixed on the output shafts, the third pair of gears being bevel gears, a spider rotatable adjacent the bevel gears, and sets of pinions rotatable on the spider for severally meshing with the bevel gears of the second pairs of gears and with the third pair of gears for forming separate differentials, one differential coacting with the speed change gears as a speed change power transmission and the other differential providing varying speeds of the wheels in turning a corner, the jaw clutches being severally engageable with and disengageable from the rotatable speed change gears for changing output shaft speed while the unit is under load.

10. In a combined speed change gearing and differential gearing unit for driving a pair of vehicle wheels, an input shaft, a gear fixed on the input shaft, a counter-shaft, a gear fixed on the counter-shaft, first pairs of meshing speed change gears for interconnecting the input shaft and the counter-shaft, one of each of the pairs of gears being rotatable and the other being fixed on its shaft, the number of pairs of speed change gears being sufficient for securing low output speeds having a ratio to the input speed of the order of 400:1 and high output speeds having a ratio to the input speed of the order of 10:1, clutches for severally engaging the rotatable speed change gears with a shaft, engagement of the several rotatable speed change gears by the clutches changing the counter-shaft speed by no more than 20% between speed change steps, a pair of coaxial output shafts, second pairs of gears rotatably and severally mounted on the output shaft, one gear of each second pair of gears being a bevel gear, the other gears of the second pairs of gears severally meshing with the gear fixed on the input shaft and the gear fixed on the counter-shaft, a third pair of gears severally fixed on the output shafts, the third pair of gears being bevel gears, a spider rotatable adjacent the bevel gears, and sets of pinions rotatable on the spider for severally meshing with the bevel gears of the second pairs and with the third pair of gears for forming separate differentials, one differential coacting with the speed change gears as a speed change power transmission and the other differential providing varying speeds of the wheels in turning a corner.

11. In a combined speed change gearing and differential gearing unit for driving a pair of vehicle wheels, an input shaft, a gear fixed on the input shaft, a counter-shaft, a plurality of gears fixed on the counter-shaft, first pairs of meshing speed change gears for interconnecting the input shaft and the counter-shaft, one of each of the pairs of gears being rotatable and the other being fixed on its shaft, the number of first pairs of gears being equal to the number of speed changes desired in either direction of rotation, clutches for severally engaging the rotatable speed change gears with a shaft for changing the speed thereof, a pair of coaxial output shafts, second pairs of gears rotatably and severally mounted on the output shaft, a gear of one of the second pairs of gears being driven at constant speed by the gear fixed on the input shaft and a gear of another second pairs of gears being driven at different speeds by engagement of different speed change gear, one gear of each second pair of gears being a bevel gear, the other gear of the second pairs of gears severally meshing with the gear fixed on the input shaft and a gear fixed on the counter-shaft, a third pair of gears severally fixed on the output shafts, the third pair of gears being bevel gears, a spider rotatable adjacent the bevel gears, and sets of pinions rotatable on the spider for severally meshing with the bevel gears of the second pairs and with the third pair of gears for forming separate differentials, one differential coacting with the speed change gears as a speed change power transmission and the other differential providing varying speeds of the wheels in turning a corner, change in direction of rotation of the output shafts depending on the algebraic sum of the speeds of the side gears of the speed changing differential whereby direction of rotation is reversed when speed of the side gear driven by the counter-shaft gear exceeds the speed of the side gear driven at constant speed.

References Cited in the file of this patent

UNITED STATES PATENTS

| | | |
|---|---|---|
| 1,953,151 | Cahill | Apr. 3, 1934 |
| 2,088,540 | Telliez | July 27, 1937 |
| 2,094,298 | Laub | Sept. 28, 1937 |
| 2,164,729 | Wilson | July 4, 1939 |
| 2,415,801 | Armitage et al. | Feb. 11, 1947 |
| 2,498,821 | Olsson | Feb. 28, 1950 |
| 2,600,562 | Meyer | June 17, 1952 |